United States Patent
Jiang et al.

(10) Patent No.: US 11,480,722 B2
(45) Date of Patent: Oct. 25, 2022

(54) OPTICAL EXPANDER DEVICE AND ITS DISPLAY DEVICE AND METHOD FOR OUTPUTTING LIGHT AND DISPLAYING IMAGE

(71) Applicant: Shenzhen Optiark Semiconductor Technologies Limited, Shenzhen (CN)

(72) Inventors: Houqiang Jiang, Shenzhen (CN); Tapani Kalervo Levola, Shenzhen (CN); Yisheng Zhu, Shenzhen (CN); Yifan Zhu, Shenzhen (CN)

( * ) Notice: Subject to any disclaimer, the term of this patent is extended or adjusted under 35 U.S.C. 154(b) by 35 days.

(21) Appl. No.: 17/131,575

(22) Filed: Dec. 22, 2020

(65) Prior Publication Data

US 2021/0109273 A1 Apr. 15, 2021

(30) Foreign Application Priority Data

Sep. 18, 2020 (CN) .......................... 202010990065.0

(51) Int. Cl.
*F21V 8/00* (2006.01)
*G02B 27/00* (2006.01)

(52) U.S. Cl.
CPC ......... *G02B 6/0016* (2013.01); *G02B 6/0038* (2013.01); *G02B 27/0081* (2013.01)

(58) Field of Classification Search
None
See application file for complete search history.

(56) References Cited

U.S. PATENT DOCUMENTS

| | | | | |
|---|---|---|---|---|
| 9,791,703 | B1* | 10/2017 | Vallius | G02B 5/1819 |
| 10,067,347 | B2* | 9/2018 | Vallius | G02B 27/0172 |
| 11,119,262 | B1* | 9/2021 | Levola | G02B 27/0081 |
| 2014/0160577 | A1* | 6/2014 | Dominici | G02B 27/0081 |
| | | | | 359/633 |
| 2019/0004219 | A1* | 1/2019 | Tervo | G02B 27/0172 |
| 2021/0109273 | A1* | 4/2021 | Jiang | G02B 27/4272 |
| 2022/0066204 | A1* | 3/2022 | Pfeiffer | G02B 6/0016 |

* cited by examiner

*Primary Examiner* — Jerry Rahll

(57) ABSTRACT

This invention relates to an optical expander device with its display device, and a method of light output and image display, including a waveguide plate, the first optical diffractive in-coupling element, the first retrieval unit, the second retrieval unit, the second optical diffractive expander element, the third optical diffractive expander element, and the fourth optical diffractive out-coupling element. The fourth optical diffractive out-coupling element forms part of the first output light (OB4), by diffracting guided light, the third retrieval light (B3a), and the fourth retrieval light (B4a) to the same direction; simultaneously, the fourth optical diffractive out-coupling element diffracts the first direct-through light (B1b) and the second direct-through light (B2b) to the same direction, forming the other part of the first output light (OB4). This device of the present disclosure may greatly improve the uniformity of the intensity distribution of the output light.

14 Claims, 7 Drawing Sheets

OPTICAL EXPANDER DEVICE AND ITS DISPLAY DEVICE AND METHOD FOR OUTPUTTING LIGHT AND DISPLAYING IMAGE

TECHNICAL FIELD

The present invention relates to the technical field of optical devices and display devices, in particular to an optical expander device and a display device and method for outputting light and displaying image.

BACKGROUD

Referring to FIG. 1, an expander device EPE0 includes a waveguide plate SUB01, which in turn comprises a diffractive in-coupling element DOE01, a diffractive expander element DOE02, and a diffractive out-coupling element DOE03. An input beam IN1 is expanded by multiple diffraction in the expander device EPE0, and finally output beam OUT1. The in-coupling element DOE01 diffracts the input light IN1 into the first guided light B1, then the first guided light B1 is diffracted by the expander element DOE02 to form an expanded guided light B3. The diffused guided light B3 is diffracted and output as light OUT1 by the diffractive out-coupling element DOE03.

The expander device EPE0 may expand the light beam in two directions—SX and SY. The width of the output beam OUT1 is much larger than that of the input beam IN1. The expander device EPE0 may be used to expand the visual pupil of the virtual display device, so that the eye (EYE1) has a larger comfortable observation position (large eyebox) relative to the observation position of the virtual display device. The observer's eyes (EYE1) may see the completed virtual image in the observation position of the output beam. The output light may comprise one or more output light beams, where each output light beam may correspond to a different image position of the displayed virtual image. The expander device may also be called e.g. an expander apparatus, an out-coupling extender.

The intensity of the guided light (B1, B3) propagating in the waveguide plate SUB01 decreases as the length of its propagation path in the expander device EPE01 increases. At the same time, the guided light has undergone many independent diffractions in the expander element DOE02. The number of diffractions is proportional to the distance of propagation. Since the optical path from the in-coupling element DOE01 to the corner region CRA is long, the output intensity of the farthest (leftmost) corner region CRA may be low. Moreover, the expander element DOE02 will further reduce the light intensity.

Therefore, the intensity of the output light in the corner region CRA at the farthest position of the diffractive out-coupling element DOE03 may be much lower than that of the output light in the center POS3c of the diffractive out-coupling element DOE03. As a result, the spatial intensity distribution of the output light of the expander device EPE0 in FIG. 1 may be uneven.

In addition, since the expander device EPE0 only diffracts the in-coupling element DOE01, the diffractive expander element DOE02 and the out-coupling element DOE03 form a single guided channel composed of direct-through light (B1, B3). Consequently, the angle of the output beam OUT1 emitted by diffractive out-coupling element DOE03 is limited, the eye EYE1 position may not obtain a larger field of view (FOV), and the corners of the image will also have color shifts or dark regions.

SUMMARY

The present disclosure introduces a new expander device and provide a method for expanding a light beam and a display device. An object is to provide a method for displaying images, which is used to expand the field of view (FOV), improve the uniformity of output light, and compress the waveguide region.

According to an aspect, there is provided an expander device (100) comprising:

A waveguide board (10) comprising:

an in-coupling element DOE01 (1) to form the first guided light (B1), the second guided light (B2), and the first reverse guided light (B-1) and the second reverse guided light (B-2) by diffracting the input light (IN1);

a first retrieval unit (2a) and a second retrieval unit (3a) to form the first retrieval light (B1a) and the second retrieval light (B2a) by diffracting the first reverse guided light (B-1) and the second reverse guided light (B-2);

an expander element (2) to form the third guided light (B3) by diffracting the first guided light (B1), and simultaneously to form the third retrieval light (B3a) by diffracting the first retrieval light (B1a); the third guided light (B3) and the third retrieval light (B3a) have the same direction;

an expander element (3) to form the fourth guided light (B4) by diffracting the second guided light (B2), and at the same time to form the fourth retrieval light (B4a) by diffracting the second retrieval light (B2a); the fourth guided light (B4) and the fourth retrieval light (B4a) have the same direction;

an out-coupling element (4) to form the first output light (OB4) by diffracting the third guided light (B3) and fourth guided light (B4) to the same direction DIR0', to form part of the first output light (OB4) by diffracting the third retrieval light (B3a) and the fourth retrieval light (B4a) to the same direction DIRA', and to form a part of the first output light (OB4) by diffracting the direct-through light (B1b) and the second direct-through light (B2b) to the same direction DIRD';

wherein, the first guided light (B1) and the first retrieval light (B1a) propagate in the first direction (DIR1), and the second guided light (B2) and the second retrieval light (B2a) propagate in the second direction (DIR2), and the angle γ12 (the angle between the first direction (DIR1) and the second direction (DIR2)) is in the range of 60° to 120°; the diffractive out-coupling element (4) comprises one or more regions (REG0, REG4a, REG4b, REG4c), using the overlapping region REG4a of the out-coupling element (4) and the expander element (2), and the overlapping region REG4c of the out-coupling element (4) and the expander element (3) to reduce the region of the entire expander device. Wherein, the third guided light (B3) and the third retrieval light (B3a) propagate in the third direction (DIR3), and the fourth guided light (B4) and the fourth retrieval light (B4a) propagate in the fourth direction (DIR4).

The superposition of the parts from different paths in the first output light (OB4) complements the missing angle and uniformity problems in the respective images to form a larger field of view angle FOV and better color uniformity therefore reduce the waveguide region.

Other embodiments are defined in the claims.

The scope of protection sought by the various embodiments of the present invention is defined by the independent claims. The embodiments (if any) described in this patent that do not fall within the scope of the independent claims will be construed as examples of various embodiments that are helpful in understanding the present invention.

BRIEF DESCRIPTION OF THE DRAWINGS

In the following examples, several changes will be described in more detail with reference to the appended drawings, in which.

DESCRIPTION OF THE EMBODIMENTS

Figure 1:
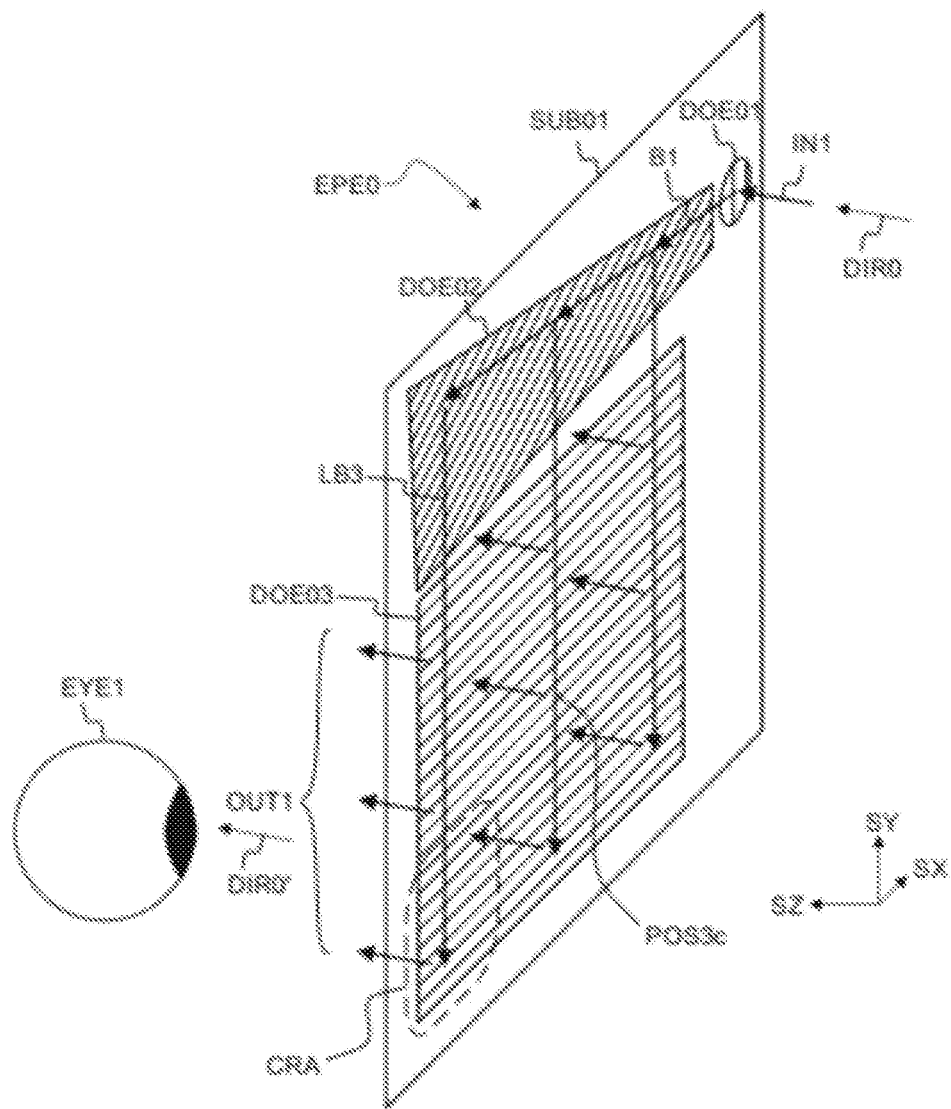
FIG. 1 shows, as an example, an expander device.
Figure 2:
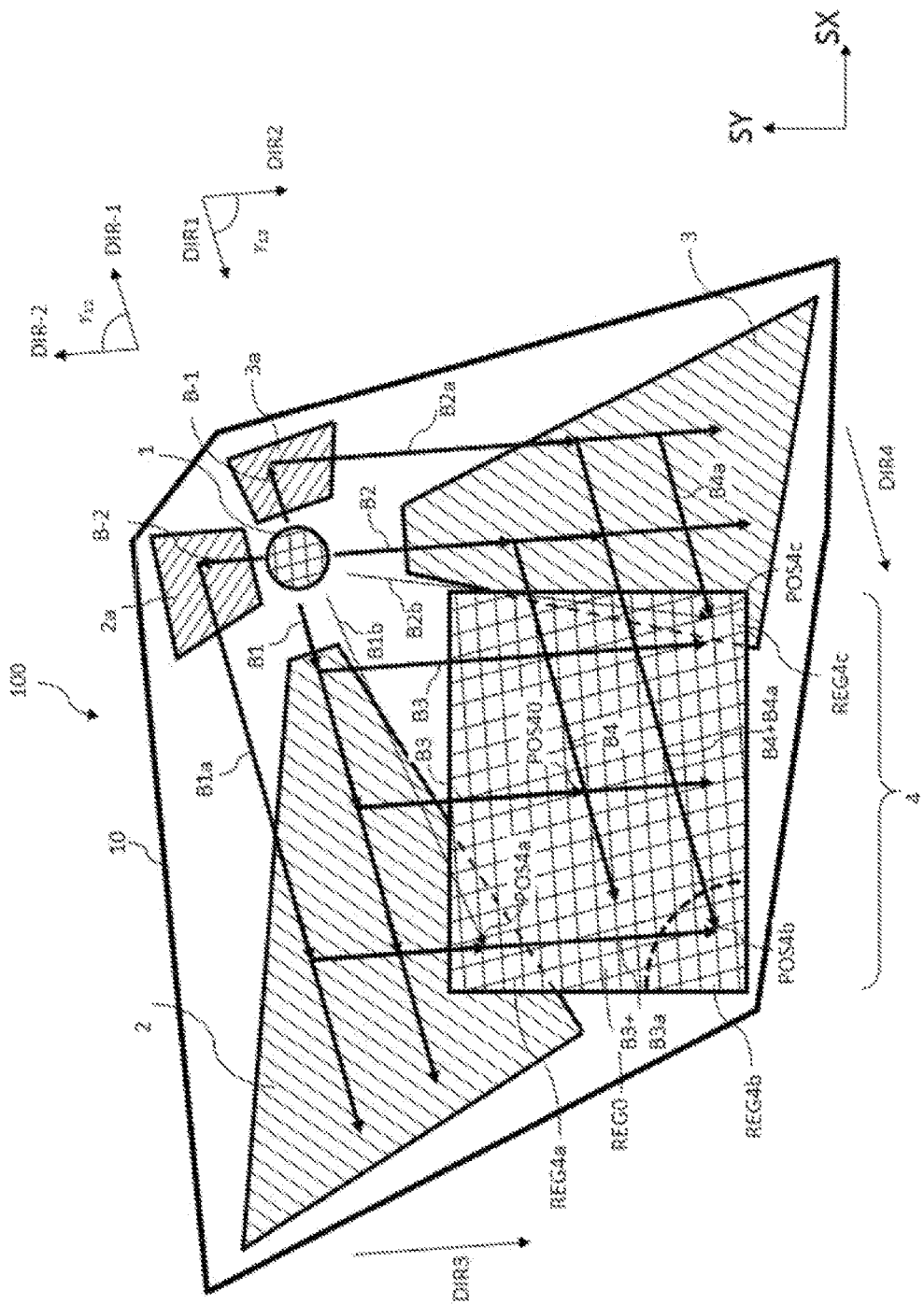
FIG. 2 shows, by way of example, in a front view, an expander device of the present invention, which shows the positions of two primary paths of light, two retrieval paths, two direct paths and overlapping regions.
Figure 3:
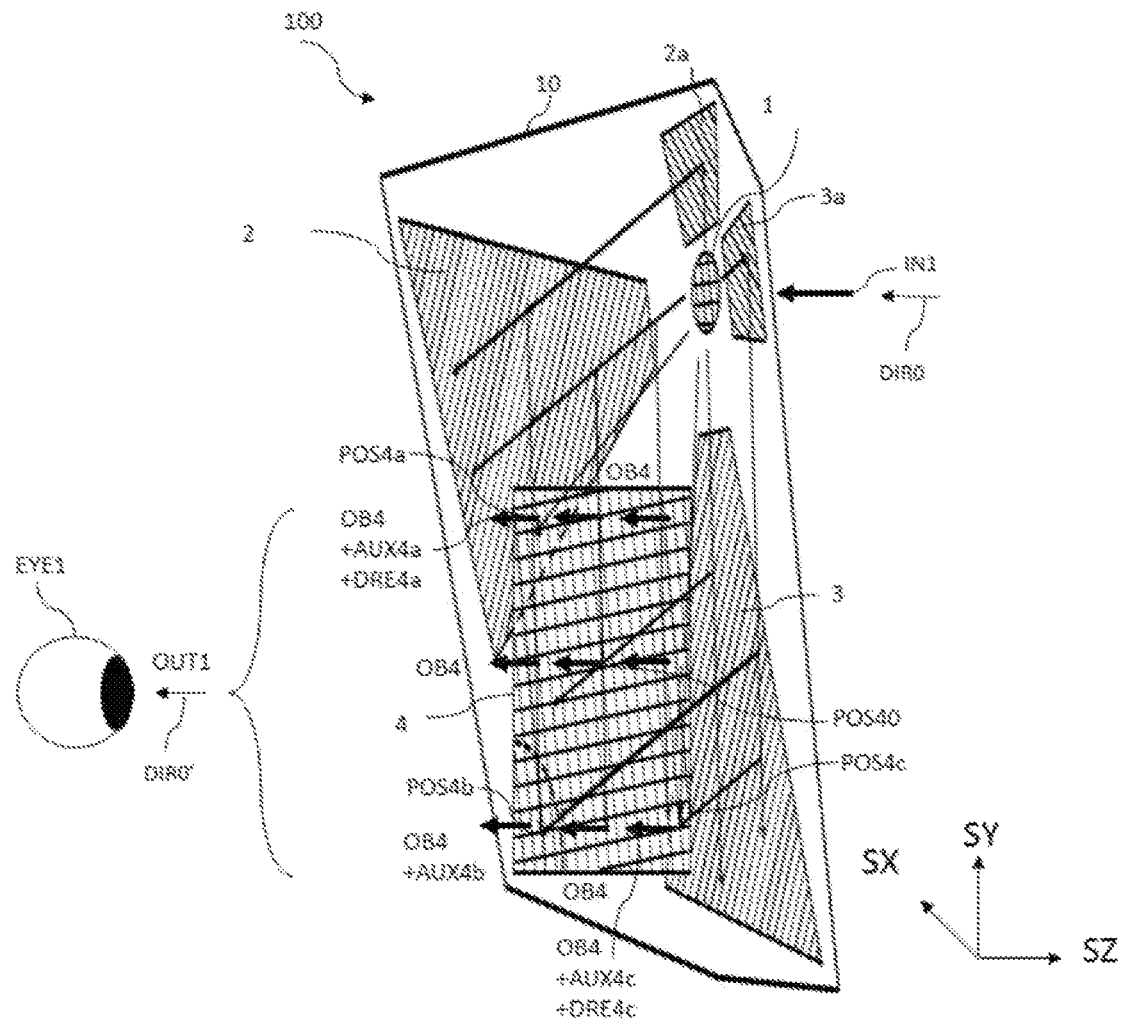
FIG. 3 shows, by way of example, in a three-dimensional view, the expander device of the present invention.

Referring to FIGS. 2 and 3, the expander device 100 comprises a planar waveguide plate 10, wherein the planar waveguide plate 10 with good flatness is preferable; the expander device 100 also comprises a first optical diffraction in-coupling element 1, a second optical diffraction expander element 2, a third optical diffraction expander element 3 and a fourth optical diffraction out-coupling element 4, a first retrieval unit 2a, and a second retrieval unit 3a.

The in-coupling element 1 may receive the input light beam IN1, and the out-coupling element 4 may provide an expanded output light beam OUT1, so that the length and width of the output light beam OUT1 are greater than the width and length of the input light beam IN1.

The expander device 100 may expand the light beam IN1 in two dimensions (for example, in the horizontal direction SX and in the vertical direction SY). The expansion process may also be called exit pupil expansion. The expander device 100 may also be called a beam-expander device or an exit pupil expander.

The first element 1 may be used as an in-coupling element. The first element 1 may form the first guided light B1, the second guided light B2, and the first reverse guided light B-1 and the second reverse guided light B-2 by diffracting the input light IN1 to. The first guided light B1, the second guided light B2, the first reverse guided light B-1 and the second reverse guided light B-2 may be waveguided in the planar waveguide plate 10. The first guided light B1, the second guided light B2, the first reverse guided light B-1 and the second reverse guided light B-2 may be confined to the planar waveguide plate 10 for total internal reflection.

The term "guided" may mean that the light propagates within the planar waveguide plate 10, and the light is confined to the plate by total internal reflection (TIR). The term "waveguide" may be the same as the term "optical waveguide".

The first guided light B1 and the second guided light B2 may have the same wavelength λ0. The first element 1 may couple the input light IN1 to propagate to the fourth optical diffractive out-coupling element 4 via two different paths, i.e. via a first primary path and via a second primary path. The first optical diffraction in-coupling element 1 may also couple the input light IN1 to propagate to the diffraction out-coupling element 4 via two different retrieval paths, i.e. via a first retrieval path and via a second retrieval path. The first optical diffractive in-coupling element 1 may also couple the input light IN1 to propagate to the diffractive out-coupling element 4 via two different short paths, i.e. via a first short path and via a second short path.

The first retrieval unit 2a recycles light energy through diffraction. First, the second reverse guided light B-2 may be guided from the first optical diffraction in-coupling element 1 to the retrieval unit 2a in the second reverse direction DIR-2. The retrieval unit 2a may form the first retrieval light B1a by diffracting the second reverse guided light B-2. The first retrieval light B1a may be confined to propagate within the waveguide plate 10 by total internal reflection.

The second retrieval unit 3a recycles light energy through diffraction. First, the first reverse guided light B-1 may be guided from the diffraction in-coupling element 1 to the retrieval unit 3a in the first reverse direction DIR-1. The retrieval unit 3a may form the second retrieval light B2a by diffracting the first reverse guided light B-1. The second retrieval light B2a may be confined to propagate within the waveguide plate 10 by total internal reflection.

The second element 2 may be used as a diffractive expander element. First, the first guided light B1 may be guided from the diffractive in-coupling element 1 to the expander element 2 in the first direction DIR1. At the same time, the first retrieval light B1a may be guided from the retrieval unit 2a to the expander element 2 also in the first direction DIR1. The second optical diffractive expander element 2 may form expanded third guided light B3 and third retrieval light B3a by respectively diffracting the first guided light B1 and the first retrieval light B1a. The expanded third guided light B3 and third retrieval light B3a may propagate from the second optical diffraction expander element 2 to the fourth optical diffraction out-coupling element 4. The expanded third guided light B3 and the third retrieval light B3a may be confined to propagate within the waveguide plate 10 by total internal reflection. In this embodiment, the second optical diffractive expander element 2 may distribute the third guided light B3 nearly uniformly to the entire region of the fourth optical diffractive out-coupling element 4. The region REG4b and the region REG4a in the figure are primary distribution positions of the retrieval light B3a, thereby further improving the uniformity of the position and increasing the FOV size.

The third element 3 may be used as a diffractive expander element. First, the second guided light B2 may be guided from the first optical diffraction in-coupling element 1 to the third optical diffraction expander element 3 in the second direction DIR2. At the same time, the second retrieval light B2a may be guided from the third retrieval unit 3a to the third optical diffractive expander element 3 also in the second direction DIR2. The third optical diffractive expander element 3 may form the expanded fourth guided light B4 and the fourth retrieval light B4a by respectively diffracting the second guided light B2 and the second retrieval light B2a. The expanded fourth guided light B4 and fourth retrieval light B4a may propagate from the third optical diffraction expander element 3 to the fourth optical diffraction out-coupling element 4. The expanded fourth guided light B4 and fourth retrieval light B4a may be refined to propagate in the waveguide plate 10 by total internal reflection. In this embodiment, the third optical diffractive expander element 3 may distribute the fourth guided light B4 nearly uniformly to the entire region of the fourth optical diffractive out-coupling element 4. The regions REG4b and REG4c are the primary distribution position of retrieval light B4a, therefore further improves the uniformity of the position and increases the FOV size.

The fourth element 4 may be used as a diffraction out-coupling element. Referring to FIGS. 2 and 3, the fourth optical diffraction out-coupling element 4 may form output light OB4 by diffracting the expanded third guided light B3 (direction DIR3) and fourth guided light B4 (direction DIR4), simultaneously form auxiliary output lights AUX4a, AUX4b and AUX4 by diffracting the third retrieval light B3a (direction is DIR3) and the fourth retrieval light B4a (direction DIR4), and form a direct-through output light DRE4a, DRE4c by diffracting the direct-through light B1b and B2b. Therefore, it may improve the overall uniformity and increase the FOV size through different light paths.

The overlapping region of the second optical diffractive expander element 2 and the fourth optical diffractive out-coupling element 4 is REG4a, which reduces the region of the overall expander device. The overlapping region REG1a may be a special region which occupies 0%-20% of the region of the expander element 2. The overlapping region REG4a not only diffracts the third guided light B3 and the third retrieval light B3a output by the second optical diffractive expander element 2, but also outputs or have an effect on the first direct-through light B1b directly diffracted by the first optical diffraction in-coupling element 1 so that it is ensured that the function of the entire out-coupling is intact, the region is reduced, and the function of the over-lapping expander region is not affected.

In an embodiment, the overlapping region REG4a may have two diffractive features, comprising a first diffractive feature to diffract the third guided light B3 and the third retrieval light B3a both received by the second optical diffractive expander element 2, and a second diffraction feature to diffract the direct-through light B1b received by the in-coupling element 1 and the guided light B4 received by the expander element 3.

The overlapping region of the third optical diffractive expander element 3 and the fourth optical diffractive expander element 4 is REG4c, which reduces the region of the overall expander device 100. The overlapping region REG4c may be a special region which occupies 0%-20% of the diffractive expander element 3. The overlapping region REG4c not only diffracts the fourth guided light B4 and the fourth retrieval light B4a output by the third optical diffractive expander element 3, but also outputs or have an effect on the first direct-through light B2b directly diffracted by the first optical diffraction in-coupling element 1. Therefore, it ensures that the function of the entire out-coupling is intact, the region is reduced, and does not affect the function of the overlapping expander region.

In an embodiment, the overlapping region REG4c may have two diffraction features, comprising a first diffraction feature to diffract the fourth guided light B4 and the fourth retrieval light B4a both received by the third optical diffractive expander element 3, and a second diffractive feature to diffract the direct-through light B2b received by the first optical diffraction in-coupling element 1 and the guided light B3 received by the second optical diffraction expander element 2.

In the embodiment, the region REG0 is the primary region of the fourth optical diffractive out-coupling element 4, comprising two diffractive features—a first diffractive feature to receive the third guided light B3 and the third retrieval light B3a from the second optical diffractive expander element 2, and a second diffractive feature to receive the fourth guided light B4 and the fourth retrieval light B4a from the third optical diffractive expander element 3. It finally diffracts to form the output light OB4 with the direction DIR0'.

The first direction DIR1 represents the average propagation direction of the first guided light B1. It may also indicate the central axis of the propagation of the first guided light B1. The first retrieval light B1a is also along the direction DIR1.

The second direction DIR2 represents the average propagation direction of the second guided light B2. It may also indicate the central axis of propagation of the second guided light B2. The second retrieval light B2a is also along the direction DIR2.

The angle γ12 is the angle between the first direction DIR1 and the second direction DIR2, and may be in the range of 60° to 120°.

The first diffracted output light OB4, the auxiliary output lights AUX4a, AUX4b and AUX4c, and the sum of the direct-through output lights DRE4a and DRE4c together obtain the output light beam OUT1. The direction of the first diffracted output light OB4 is DIR0'; the direction of the auxiliary output light UX4a, AUX4b and AUX4c is DIRA'; the direction of the direct-through output light DRE4a, DRE4c is DIRD'; the direction of the output light beam OUT1 is DIR0'; DIRA' and DIRD' are parallel to the direction DIR0 of the input beam IN1.

The expanded third guided light B3 may propagate in the third direction DIR3, and the expanded fourth guided light B4 may propagate in the fourth direction DIR4.

In the embodiment, the first primary route is from first optical diffractive in-coupling element 1 to the second optical diffractive expander element 2 to the fourth optical diffractive out-coupling element 4; the second primary route is from the first element 1 to the third optical diffractive expander element 3 and then to the fourth element 4; the first retrieval route is from the first element 1 to the first retrieval unit 2a to the second element 2 and finally to the fourth element 4; the second retrieval route is from the first element 1 to the second retrieval unit 3a to the third element 3, and then to the fourth element 4; the first short path is from the first element 1 directly to the region REG4a of the fourth element 4 (may pass through 2 but does not change the direction); the second short path is from the first element 1 directly to the Region REG4c of the fourth element 4 (may pass 2 but does not change direction).

SX, SY and SZ indicate orthogonal directions. The waveguide plate 10 is parallel to the plane defined by the directions SX and SY.

Figure 4:
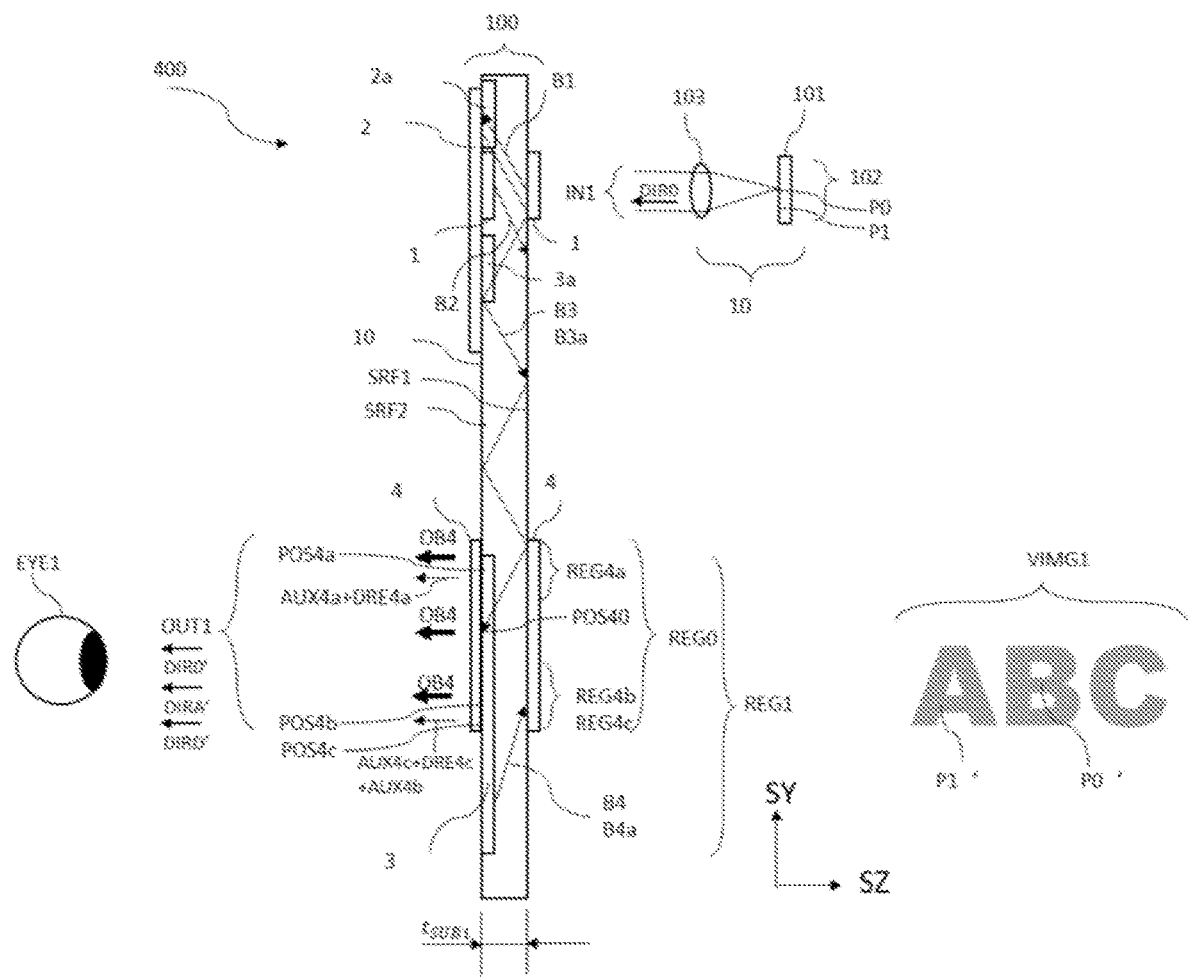
FIG. 4 shows, by way of example, in a cross-sectional side view, the expander device, which comprising the display device.
Figure 7:
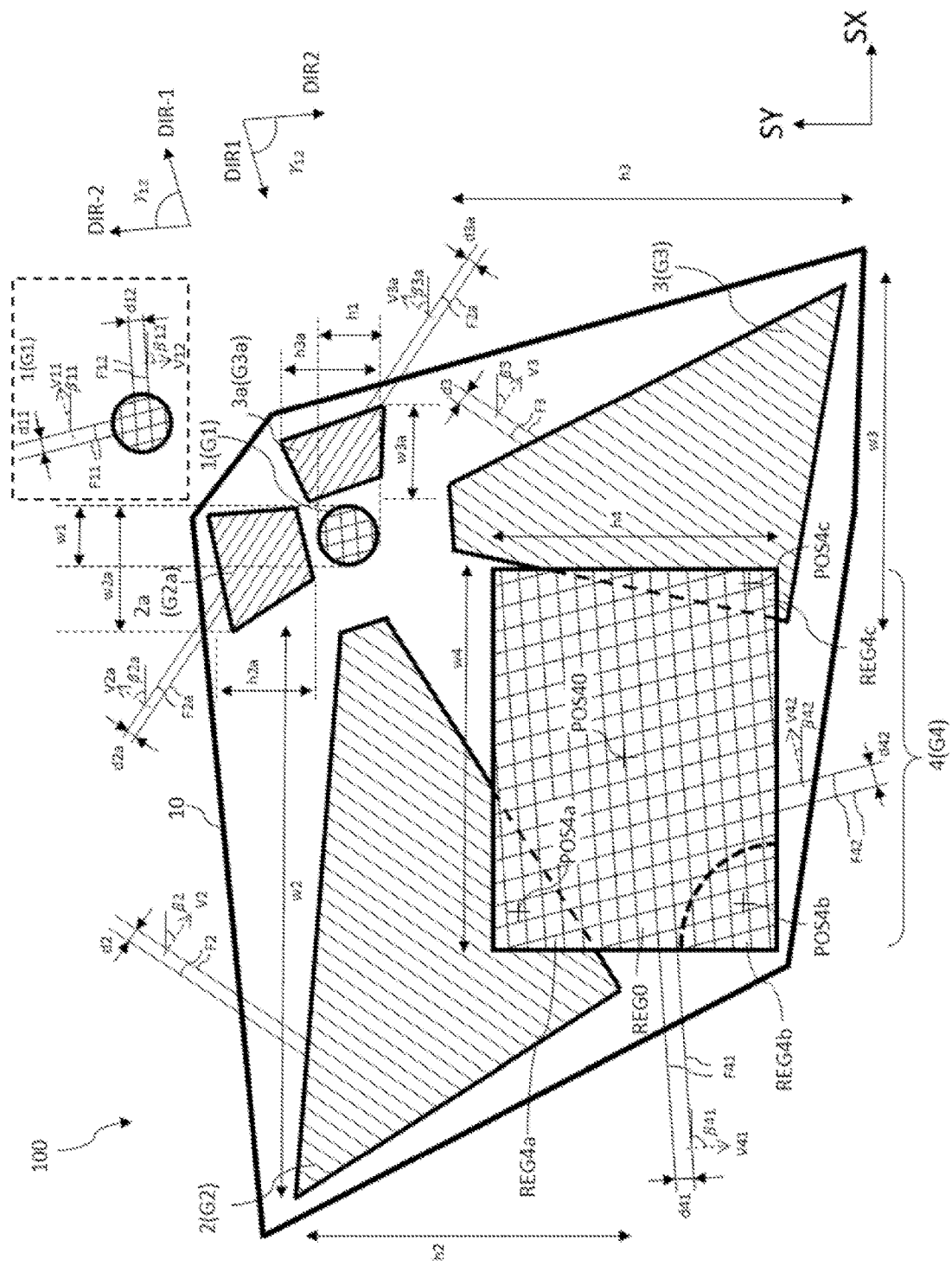
FIG. 7 shows, by way of example, in a front view, the expander device.

In an embodiment, as shown in FIGS. 2, 4 and 7, position POS4a is a certain position in REG4a; position POS4b is a certain position in REG4b; position POS4c is a certain position in REG4c; and position POS40 is the center position of the fourth optical diffractive out-coupling element 4. By controlling the energy of different routes, the output light intensity of different positions POS4a, POS4b, POS4c, and POS40 may be close, thereby improving uniformity.

Referring to FIG. 3, the expander device 100 comprises multiple routes, thereby increasing and optimizing the uniformity of the spatial intensity distribution and field of view FOV of the output light beam OUT1. For example, the point POS4a in the overlapping region REG4a may simultaneously receive the light from the third guided light B3, the fourth guided light B4, the third retrieval light B3a and the direct-through light B1b. They may be superimposed by controlling the efficiency of the four beams. For example, if the intensity of the third light B3 is small, then the fourth light B4 may be increased, or if the intensity of the light B4 is small, then the third light B3 may be increased, and the light of the third retrieval light B3a and the through light B1b may be increased to get a further compensation, achieving better spatial intensity distribution and larger field of view FOV. Positions POS4b and POS4c also have similar features.

The expander device 100 may optimize the output light beam OUT1 such that the light intensity of the output light beam OUT1 at the first position POS4a, the second position POS4b, the third position POS4c, and the center position POS40 (I POS4a, I POS4b, I POS4c, I POS40) are basically equal.

The input beam IN1 has a propagation direction DIR0. The input beam IN1 may correspond to a point on the displayed image. The expander device 100 may convert the light of the input light beam IN1 into the output light beam OUT1 so that the output light beam OUT1 has a propagation direction DIR0'. After the optical input beam IN1 is converted into the output beam OUT1 by the expander device 100, the direction DIR0' and the direction DIR0 are parallel.

The period (d) and direction (β) of each diffraction grating—the first optical diffractive in-coupling element 1, the second optical diffractive expander element 2, the third optical diffractive expander element 3, the fourth optical diffractive out-coupling element 4, the first retrieval unit 2a, and the second retrieval unit 3a—are carefully designed so that the direction DIR0' of the output beam OUT1 is parallel to the direction DIR0 of the input beam IN1.

Referring to FIG. 4, the display device 400 comprises an expander device 100 and an optical light engine 10. An optical engine 10 provides a primary image 102 and converts it into a plurality of input light beams IN1. The light emitted from the optical engine 10 enters the optical diffractive in-coupling element 1 of the expander device 100. The plurality of input light beams IN1 are diffracted by the first optical diffractive in-coupling element 1 to enter the expander device 100. The display device 400 is a display device for displaying a virtual image, or may be called a near-eye optical display device.

The expander device 100 may carry virtual image content from the light engine 10 to the front of the user's eyes EYE1. The expander device 100 may expand the viewing pupil, thus enlarging the eye box.

The optical engine 10 may comprise a micro-display 101 to generate a primary image 102. The micro-display 101 may comprise a two-dimensional array of light-emitting pixels. The micro-display 101 may generate the primary image 102, e.g. at a resolution of 1920×1080 (full high definition). The display 101 may generate a primary image 102, e.g. at a resolution of 3840×2160 (4K UHD). The primary image 102 may comprise a plurality of image points P0, P1. The optical engine 10 may comprise collimating optics 103 to form a light beam different from each image pixel. The light beam from the image point P0 of the light passes through the collimating optics 103 of the optical engine 10 to form a substantially collimated light beam. The beam propagation direction corresponding to the image point P0 is the propagation direction DIR0. A different image point P1 may have a different beam propagation direction from directions DIR0. The engine 10 may provide a plurality of light beams corresponding to the generated primary image 102. One or more light beams provided by the optical engine 10 may be coupled to the expander 100 as the input light IN1.

The optical engine 10 may comprise e.g. one or more light emitting diodes (LEDs). The display 101 may comprise e.g. one or more micro-display images, such as liquid crystal on silicon (LCOS), liquid crystal display (LCD), digital micromirror display (DMD), and Micro-LED display.

Referring to FIG. 4, the fourth element 4 may be used as an optical diffractive out-coupling element. It may form output light OB4 by diffracting the expanded third guided light B3 (direction DIR3) and B4 (direction DIR4), simultaneously form auxiliary output lights AUX4a, AUX4b and AUX4c by diffracting the third retrieval light B3a (direction DIR3) and the fourth retrieval light B4a (direction DIR4), and form the direct-through output lights DRE4a and DRE4c by diffracting the first direct-through light B1b and the second direct-through light B2b.

The sum of the first diffracted output light OB4, the auxiliary output light AUX4a, AUX4b, AUX4c, and the direct-through output light DRE4a and DRE4c creates the output light beam OUT1. The direction of output light OB4 is DIR0'; the direction of auxiliary output light UX4a, AUX4b and AUX4c is DIRA', the direction of direct-through output light DRE4a, DRE4c is DIRD'; the direction of output light OUT1 (DIR0', DIRA', DIRD') is parallel to the direction of the input beam IN1 (DIR0) and also corresponds to the same point on the image (for example, P0). The output beam OUT1 may be formed by the input beam IN1 such that the direction DIR0' is parallel to the direction DIR0 of the input beam IN1. Each element 1, 2, 2a, 3a, 3, 4 may contain one or more of the diffraction gratings described.

The grating period (d), the grating direction (β), and grating vector (V) of the first optical diffractive in-coupling element 1, the second optical diffractive expander element 2, the third optical diffractive expander element 3, the fourth optical diffractive out-coupling element 4, the first retrieval unit 2a, and the second retrieval unit 3a may be designed. By designing, the directions of the first diffractive output light OB4, auxiliary output light AUX4a, AUX4b, AUX4c, and direct-through output light DRE4a and DRE4c may be parallel.

For the first primary path, by designing the grating period (d), grating direction (β) and grating vector (V), the sum of grating vectors of the first optical diffractive in-coupling element 1, the second optical diffractive expander element 2, and the fourth optical diffraction out-coupling element 4 may be zero.

For the second primary path, by designing the grating period (d), grating direction (β) and grating vector (V), the sum of grating vectors of the first optical diffractive in-coupling element 1, the third optical diffractive expander element 3, and the fourth optical diffractive out-coupling element 4 may be zero.

For the first retrieval path, by designing the grating period (d), grating direction (β) and grating vector (V), the sum of grating vectors of the first optical diffractive in-coupling element 1, the first retrieval unit 2a, the second optical diffractive out-coupling element 2, and the fourth optical diffractive out-coupling element 4 may be zero.

For the second retrieval path, by designing the grating period (d), grating direction (β) and grating vector (V), the sum of grating vectors of the first optical diffractive in-coupling element 1, the second retrieval unit 3a, the third optical diffractive expander element 3, and the fourth optical diffractive out-coupling element 4 may be zero.

For the first short path, by designing the grating period (d), grating direction (β) and grating vector (V), the sum of the grating vectors of the first optical diffractive in-coupling element 1 and the region REG4a may be zero.

For the second short path, by designing the grating period (d), grating direction (β) and grating vector (V), the sum of the grating vectors of the first optical diffractive in-coupling element 1 and the region REG4c may be zero.

The thickness of the waveguide plate 10 is $t_{SUB1}$. The waveguide plate 10 comprises a planar waveguide core. In an embodiment, the waveguide plate 10 may optionally comprise e.g. one or more plating layers, one or more protective layers, and/or one or more mechanical support layers. $t_{SUB1}$ refers to the thickness of the core part of the waveguide plate 10.

The expander device 100 may expand the light beam in two directions, the direction SX and the direction SY. The width of the output beam OUT1 (in the direction SX) may be greater than the width of the input beam, and the height of the output beam OUT1 (in the direction SY) may be greater than the height of the input beam IN1.

The expander device 100 may expand the visual pupil of the virtual display device 400 to facilitate the positioning of the eye EYE1, thereby realizing a large observation range. The human observer's eyes at the position EYE1 of the virtual display device 400 may see the virtual image VIMG1 that transmitted by the output light OUT1. The output light OUT1 may comprise one or more output light beams, wherein each output light beam may correspond to a different image point (P0', P1') of the virtual image. The engine 10 comprises a micro-display for displaying the primary image 102. The optical engine 10 and the expander device 100 may convert the primary image 102 into a display virtual image VIMG1 with multiple input light beams and forms the output light beam OUT1. Since the input light beam IN1 to the output light OUT1 may comprise multiple input and output light beams, each output beam may form a different image point (P0', P1') of the virtual image VIMG1. The, primary image 102 may be graphics, text or video. The optical engine 10 and the expander device 100 may display a virtual image VIMG1, and make each image point (P0', P1') of the virtual image VIMG1 correspond to a different image point of the primary image 102.

Figure 5:
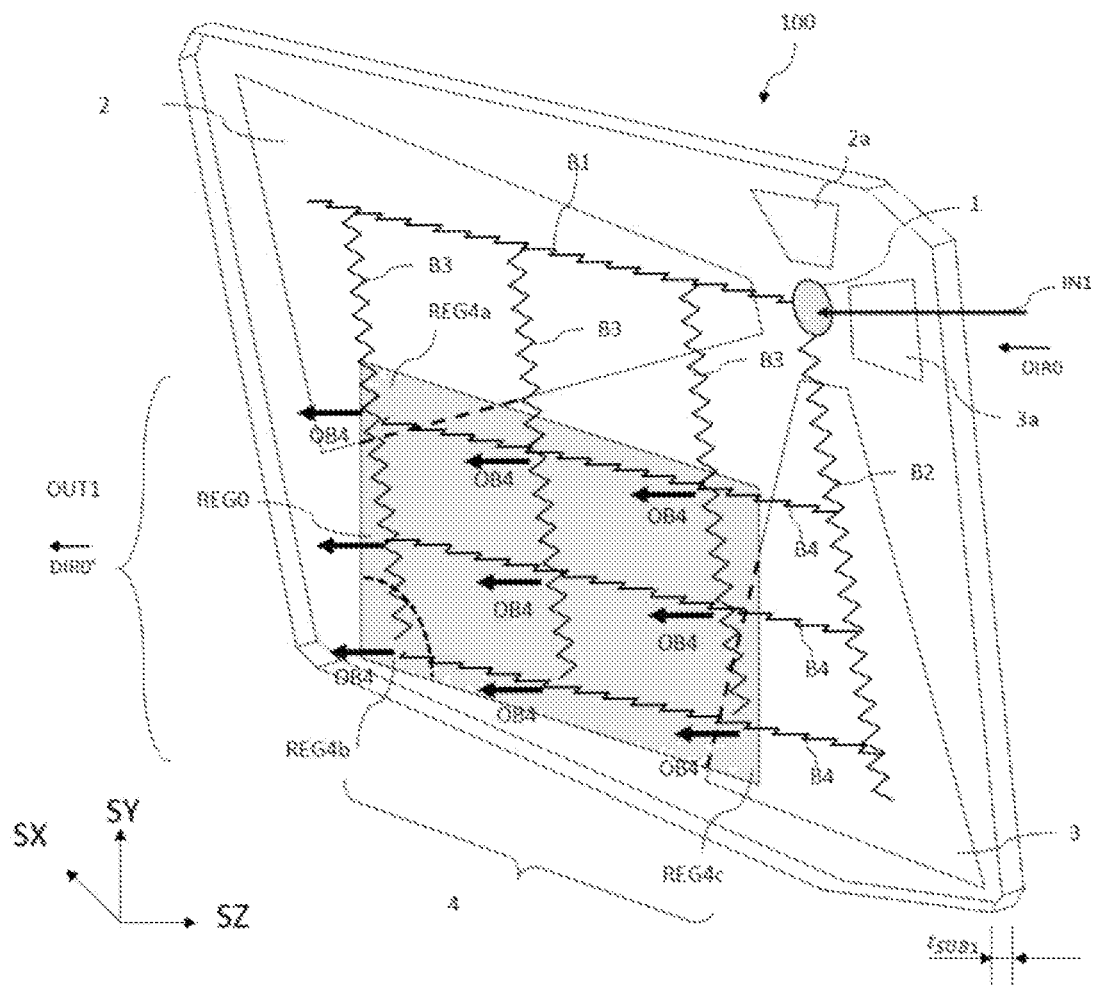
FIG. 5 shows, by way of example, in a three-dimensional view, forming the final output light OB4 by two primary paths in the expander device.

Referring to FIG. 5, the first primary path is the propagation path from the first optical diffractive in-coupling element 1 to the second optical diffractive expander element 2 and then to the fourth optical diffractive out-coupling element 4; the second primary path is the propagation path from the first optical diffractive in-coupling element 1 to the third optical diffractive expander element 3 and then to the fourth optical diffractive out-coupling element 4; the guided light passing through the first primary path and the second primary path finally constitutes a part of the output light OUT1. The third guided light B3 emitted from the second optical diffractive expander element 2 is relatively uniformly distributed to the fourth optical diffractive out-coupling element 4, almost covering the region REG4a, REG4b, REG4c and REG0. The fourth guided light B4 emitted from the third optical diffractive expander element 3 is relatively uniformly distributed to the optical diffractive out-coupling element 4, almost covering the region REG4a, REG4b, REG4c and REG0, and forms output light OB4 diffracted by the fourth optical diffractive out-coupling element 4, and the direction is DIR0', thereby becoming a part of output light OUT1.

Figure 6:
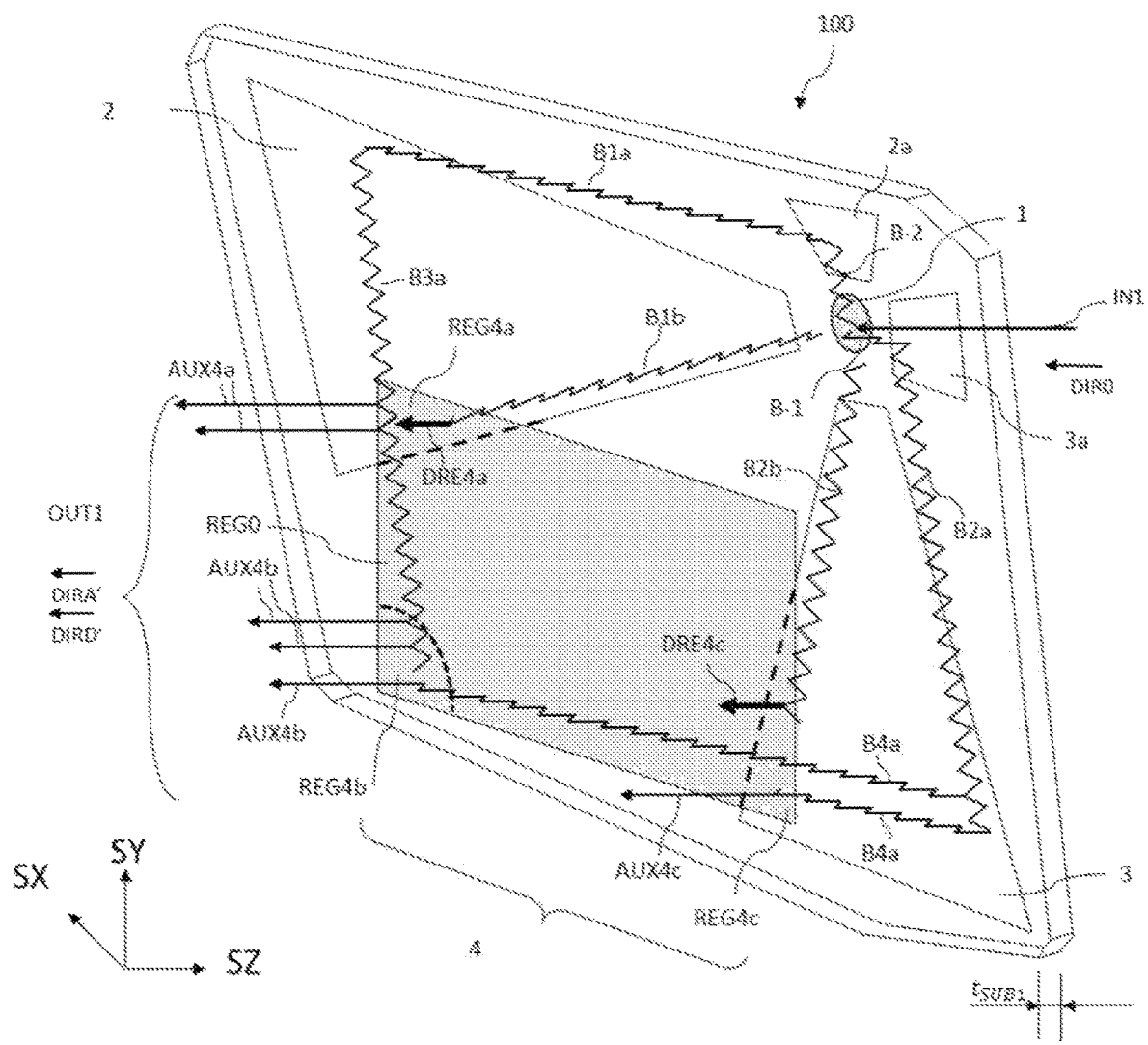
FIG. 6 shows, by way of example, in a front view, forming the Portions of the final output light OB4 by two retrieval paths and two short paths in the expander device.

Referring to FIG. 6, the first retrieval path is a propagation path from the first optical diffraction in-coupling element 1, to the first retrieval unit 2a, to the second optical diffraction expander element 2, and finally to the fourth optical diffraction out-coupling element 4; The second retrieval path is a propagation path from the first optical diffractive in-coupling element 1, to the second retrieval unit 3a, to the third optical diffractive expander element 3, and then to the fourth optical diffractive out-coupling element 4; the first short path is a propagation path from the first optical diffractive in-coupling element 1 to the region REG4a; the second short path is a propagation path from the first optical diffractive in-coupling element 1 to the region REG4c; and finally constitutes a part of the output light OUT1. The first retrieval path is diffracted by the fourth optical diffractive out-coupling element 4 to form output light AUX4a in the region REG4a with a direction of DIRA' and output light AUX4b in the region REG4b with a direction of DIRA'. The second retrieval path is diffracted by the fourth optical diffraction exit pupil element 4 in the region REG4c into output light AUX4c in the direction of DIRA', and diffracted in the region REG4b into output light AUX4b in the direction of DIRA'. The first short path is diffracted by the fourth optical diffractive out-coupling element 4 in the region REG4a to form output light DRE4a, and the direction is DIRD'; the second short path is diffracted by the out-coupling element 4 in the region REG4c to form output light DRE4c, and the direction is DIRD'. The above multiple output lights of AUX4a, AUX4b, AUX4c, DRE4a, and DRE4c are superimposed on each other to become part of the output light OUT1. By performing optical path compensation on the edge of the fourth optical diffractive out-coupling element 4, especially the regions REG4a, REG4b, and REG4c, better uniformity and larger FOV are obtained.

Referring to FIG. 7, the first optical diffractive in-coupling element 1, the second optical diffractive expander element 2, the first retrieval unit 2a, the second retrieval unit 3a, the third optical diffractive expander element 3, and the fourth optical diffractive out-coupling element 4 may all comprise one or more diffraction gratings to diffract light. For example, the first optical diffractive in-coupling element 1 may comprise one or more gratings G1; the second optical diffractive expander element 2 may comprise a grating G2; the fourth optical diffractive out-coupling element 4 may comprise one or more gratings G4. Specifically, the basic region REG0 may comprise one or more gratings G4, e.g. the overlapping region REG4A may comprise one or more gratings G4.

Diffraction gratings are generally described by grating period (d), grating direction (β) and grating vector (V). In addition, a diffraction grating also comprises multiple diffraction features (F), which may also be used to design and manipulate diffracted light. The diffraction feature may be e.g. microscopic ridges or grooves, microscopic protrusions (or depressions), wherein the protrusions (or depressions) in adjacent rows may be used as diffraction lines. The grating vector (V) is defined as a vector with a direction perpendicular to the diffraction line of the diffraction grating with a magnitude of $2\pi/d$, where d is the grating period.

The first optical diffractive in-coupling element 1 has grating vectors V11, V12. The second retrieval unit 2a has a beam vector V2a. The third retrieval unit 3a has a beam vector V3a. The second optical diffractive expander element 2 has a grating vector V2. The third optical diffractive expander element 3 has a grating vector V3. The fourth optical diffractive out-coupling element 4 has grating vectors V41 and V42. The grating vector V11 has a direction β11 and a magnitude of 2π/d11. The grating vector V12 has a direction β12 and a magnitude of 2π/d12. The grating vector V2a has direction β2a and size 2π/d2a. The grating vector V3a has a direction β3a and a magnitude of 2π/d3a. The grating vector V2 has direction β2 and size 2π/d2. The grating vector V3 has direction β3 and magnitude 2π/d3. The grating vector V41 has a direction β41 and a magnitude of 2π/d41. The grating vector V42 has a direction β42 and a magnitude of 2π/d42. The grating vector V2a is basically the same as the grating vector V3a; the grating vector V2 is basically the same as the grating vector V3; the grating vector V41 is basically the same as the grating vector V12, and the grating vector V11 is the same as the grating vector V42. The grating vector direction (β) may be specified as e.g. the angle between the grating vector direction and the reference direction (for example, direction SX).

The grating periods (d) and the directions (β) of the grating vectors V of the first optical diffractive in-coupling element 1, the second optical diffractive expander element 2, the first retrieval unit 2a, the second retrieval unit 3a, the third optical diffractive expander element 3, and the fourth optical diffractive out-coupling element 4 may be designed to make the first output beam separate the first diffractive output light OB4, the auxiliary output light AUX4a, AUX4b and AUX4c. The direction of the, direct-through output light DRE4a and DRE4c are parallel to DIR0'.

The angle between the directions of the grating vectors V12 and V11 of the first optical diffractive in-coupling element 1 may be e.g. in the range of 60° to 120°. The grating period d12 of the element 1 may be basically equal to the grating period d11. The grating period d12 of the first optical diffractive in-coupling element 1 may also be basically equal to the grating period d11.

The grating period (d) and direction (β) of the grating vector (V11, V2, V41) may be designed to satisfy that, for example, the vector sum of the grating vectors (V11, V2, V41) of the first optical diffractive in-coupling element 1, the second optical diffractive expander element 2, and the fourth optical diffractive out-coupling element 4 is zero. Specifically, the detailed design of the grating period d11, d2, d41 and the direction β11, β2, β41 may be used to control the grating vectors V11, V2, V41 so that the vector sum of the grating vectors V11, V21, V41 is zero.

The grating period (d) and direction (β) of the grating vector (V12, V3, V42) may be designed so that the vector sum of the grating vector (V12, V3, V42) of element 1, 3, 4 is zero. Specifically, the detailed design of the grating period d12, d3, d42 and the direction β12, β3, β42 may be used to control the grating vectors V12, V3, V42 so that the vector sum of the grating vectors V12, V21, V42 zero.

The grating period (d) and direction (β) of the grating vector (V12, V2a, V2, V41) may be designed so that the sum of grating vector (V12, V2a, V2, V41) of element 1, 2a, 2, and 4 is zero. Specifically, the detailed design of the grating period d12, d 2a, d2, d41 and the direction β12, β2a, β2, β41 may be used to control the grating vector V12, V2a, V2, V41 so that the vector sum of V12, V2a, V2, and V41 is zero.

The grating period (d) and direction (β) of the grating vector (V11, V3a, V3, V42) may be designed so that the sum of the grating vector (V11, V3a, V3, V42) of element 1, 3a, 2, 4 is zero. Specifically, the detailed design of the grating period d11, d3a, d3, d42 and the direction β11, β3a, β3, β42 may be used to control the grating vector V11, V3a, V3, V42 so that the vector sum of V11, V3a, V3, and V42 is, zero.

The grating period (d) and direction (β) of the grating vector (V11, V42) may be designed so that the vector sum of the grating vector (V11, V42) of element 1, 4 is zero. Specifically, the detailed design of the grating period d11, d42 and the direction β11, β42 may be used to control the grating vectors V11 and V42 so that the vector sum of V11 and V42 is zero.

The grating period (d) and direction (β) of the grating vector (V12, V41) may be designed so that the vector sum of the grating vector (V12, V41) of element 1, 4 is zero. Specifically, the detailed design of the grating period d12, d41 and the direction β11, β42 may be used to control the grating vectors V12 and V41 so that the vector sum V12 and V41 is zero.

The first optical diffractive in-coupling element 1 may have a first grating vector V11 to form the first guided light B1 along the direction DIR1, and a second grating vector V12 to form the second guided light B2 along the direction DIR2. The first optical diffractive in-coupling element 1 may have a first diffractive feature F11, a first grating period d11 and a first direction β11 (relative to the reference direction SX). The first optical diffractive in-coupling element 1 may have a second diffraction feature F12, a second grating period d12 and a second direction β12 (relative to the reference direction SX). The first optical diffractive in-coupling element 1 may be e.g. a grating as shown in the figure realized by a cross grating or by two linear gratings. The first linear grating with feature F11 may be arranged on the first side of the board 10 (e.g. on the input side SRF1), and the second linear grating with feature F12 may be arranged on the second side of the waveguide plate 10 (for example on the On the output side SRF2), or both may be set on the same side surface SRF1 or SRF2 to form two-dimensional gratings. The structure feature of the diffraction grating may be e.g. microscopic ridges or tiny protrusions.

The grating with a single grating feature may be set on the surface SRF1 or the surface SRF2, and the grating with two or more grating features may be set on the surface SRF1 or the surface SRF2 respectively, or in the form of a two-dimensional or multi-dimensional grating on each of the surfaces. All gratings in the text are described in this way.

The second optical diffractive expander element 2 may have a first grating vector V2, so that the first guided light B1 is diffracted to form the third guided light B3. The grating G2 of the second optical diffractive expander element 2 may have a diffractive feature F2, which has a grating period d2 and a direction β2 (relative to the reference direction SX).

The first retrieval unit 2a may have a first grating vector V2a, so that the second reverse-guided light B-2 is diffracted to form retrieval light B1a. The grating G2a of the first retrieval unit 2a may have a diffraction feature F2a, which has a grating period d2a and a direction β2a (relative to the reference direction SX).

The second recycling element 3a may have a first grating vector V3a, so that the first reverse-guided light B-1 is diffracted to form retrieval light B2a. The grating G3a of the second retrieval unit 3a may have a diffraction feature F3a, which has a grating period d3a and a direction β3a (relative to the reference direction SX).

The third optical diffractive expander element 3 may have a first grating vector V3, so that the second guided light B2 is diffracted to form the fourth guided light B4. The grating G3 of the third optical diffractive expander element 3 may have a diffraction feature F3, which has a grating period d3 and a direction β3 (relative to the reference direction SX).

The fourth optical diffractive out-coupling element 4 may have a first grating vector V41 to diffract the third guided light B3, the third retrieval light B3a, and the second direct-through light B2b, wherein the third guided light B3 forms the first output light OB4, the third retrieval light B3a forms the auxiliary output light AUX4a and AUX4b, and the first direct-through light B2b forms the direct-through output light DRE4c. The fourth optical diffractive out-coupling element 4 may have a first diffractive feature F41, a first grating period d41 and a first direction β41 (relative to the reference direction SX). Simultaneously, the fourth optical diffractive out-coupling element 4 may have a second grating vector V42 to diffract the fourth guided light B4, the fourth retrieval light B4a, and the first direct-through light B1b, wherein the fourth guided light B4 forms the output light beam OB4, the fourth retrieval light B4a forms AUX4c and AUX4b, and the first direct-through light B1b forms a direct-through output light DRE4a. The fourth optical diffractive out-coupling element 4 may have a second diffraction feature F42, a second grating period d42, and a second direction β42 (relative to the reference direction SX). The fourth optical diffractive out-coupling element 4 may be e.g. a grating as shown in the figure realized by a cross grating or by two linear gratings. The first linear grating with feature F41 may be set on the first side of the board 10 (e.g. on the input side SRF1), and the second linear grating with feature F42 may be set on the second side of the waveguide plate 10 (e.g. on the output side SRF2), or both may be set on the same side surface SRF1 or SRF2 to form two-dimensional gratings. The structure feature of the diffraction grating may be e.g. microscopic ridges or tiny protrusions. The positions and sizes of the first optical diffractive in-coupling element 1, the second optical diffractive expander element 2, the third optical diffractive expander element 3, and the fourth optical diffractive out-coupling element 4 may be set to make the first guided light (B1) not interact with the third optical diffractive expander element 3 and the fourth optical diffractive out-coupling element 4, and the second guided light (B2) not interact with the second optical diffractive expander element 2.

The first optical diffractive in-coupling element 1 may have a width w1 and a height h1. The second optical diffractive expander element 2 may have a width w2 and a height h2. The first retrieval unit 2a may have a width w2a and a height h2a. The second retrieval unit 3a may have a width w3a and a height h3a. The third optical diffractive expander element 3 may have a width w3 and a height h3. The fourth optical diffractive out-coupling element 4 may have a width w4 and a height h4. The width represents the size in the direction SX, and the height represents the size in the direction SY. The fourth optical diffractive out-coupling element 4 may be rectangular. The edges of the fourth optical diffractive out-coupling element 4 are along the directions SX and SY respectively.

The width w2 of the second optical diffractive expander element 2 is much larger than the width w1 of the first optical diffractive in-coupling element 1, so the width of the expanded third guided light B3 is much larger than that of the input light beam IN1. The height h3 of the third optical diffractive expander element 3 is much larger than the height h1 of the first optical diffractive in-coupling element 1, so the width of the expanded fourth guided light B4 is much larger than that of the input, light beam IN1.

The first position POS4a is a certain position in the second region REG4a, the second position POS4b is a certain position in the third region REG4b; the third position POS4c is a certain position in the fourth region REG4c; and the center position POS40 is the center position of the fourth optical diffraction out-coupling element 4. The horizontal distance between the center position POS40 and the first position POS4a may be about 40% of the width w4 of the fourth optical diffractive out-coupling element 4.

The waveguide plate 10 may be composed of a transparent solid material, such as glass, polycarbonate, or polymethyl methacrylate (PMMA). The first optical diffractive in-coupling element 1, the second optical diffractive expander element 2, the first retrieval unit 2a, the second retrieval unit 3a, the third optical diffractive expander element 3, and the fourth optical diffractive out-coupling element 4 may be formed by molding, embossing and/or etching, holographic exposure, etc., and may be realized by one or more surface diffraction gratings or one or more volume holographic diffraction gratings.

In an embodiment, the input light IN1 may be substantially monochromatic or different input wavelengths λ0. All light beams IN1, B1, B2, B3, B4, B-1, B-2, B1a, B2a, B3a, B4a, OUT1, OB4 may have the same wavelength λ0.

The spatial distribution of diffraction efficiency may be controlled by selecting the local parameters of the microscopic diffraction feature F. By controlling the parameters of the microscopic diffraction feature F of the fourth optical diffractive out-coupling element 4, the uniformity of the intensity distribution of the output light OUT1 is further improved.

The display apparatus 400 may be a virtual reality device 400 or an augmented reality device 400. The display device 400 may be a near-eye device or a wearable device, e.g. a headset. The device 400 may be used for e.g. a headband, by which the device 400 may be worn on a user's head. During the operation of apparatus 400, the fourth optical diffractive out-coupling element 4 of the apparatus 400 is placed in front of the user's left eye EYE1 or right eye EYE1. The apparatus 400 may project the output light OUT1 into the user's eye EYE1. In an embodiment, the apparatus 400 may comprise two engines 10 and/or two expander devices 100 to display stereo images. In the augmented reality apparatus 400, the viewer may not only see the virtual image displayed by the expander device 100, but also the real object and/or environment. The engine 10 may generate still images and/or videos. The engine 10 may generate a real primary image 102 from the digital image. The engine 10 may receive one or more digital images from an internet server or from a smartphone. The device 400 may be a smart phone. The displayed image may be seen by people, and the displayed image may also be viewed by e.g. an animal or machine (which may comprise e.g. a camera).

For the person skilled in the art, it will be clear that modifications and variations of the devices and methods according to the present invention are perceivable. The figures are schematic. The particular embodiments described above with reference to the accompanying drawings are illustrative only and not meant to limit the scope of the invention, which is defined by the appended claims.

What is claimed is:

1. An optical expander device (100), comprising a waveguide plate (10), characterized by further comprising:
  a first optical diffractive in-coupling element (1) to form the first guided light (B1), the second guided light (B2), and the first reverse guided light (B-1), second reverse guided light (B-2), the first optical first direct-through light (B1b) and second direct-through light (B2b) by diffracting the input light (IN1);
  a first retrieval unit (2a) and the second retrieval unit (3a), wherein
  the first reverse guided light (B-1) and the second reverse guided light (B-2) are respectively diffracted by the first retrieval unit (2a) and second retrieval unit (3a) to form the first retrieval light (B1a) and the second retrieval light (B2a);

a second optical diffractive expander element (2) to form the third guided light (B3) by diffracting the first guided light (B1), and to form the third retrieval light (B3a) by diffracting the first retrieval light (B1a), wherein the third guided light (B3) and the third retrieval light (B3a) have the same direction;

a third optical diffractive expander element (3) to form the fourth guided light (B4) by diffracting the second guided light (B2), and simultaneously to form fourth retrieval light (B4a) by diffracting the second retrieval light (B2a), wherein the fourth guided light (B4) and the fourth retrieval light (B4a) have the same direction;

a fourth optical diffractive out-coupling element (4) to form the first part of the first output light (OB4) by diffracting the third guided light (B3) and the fourth guided light (B4) to the same direction DIR0', and to form the second part of the first output light (OB4) by diffracting the third retrieval light (B3a) and the fourth retrieval light (B4a) to the same direction DIRA', and to form the third part of the first output light (OB4) by diffracting the first direct-through light (B1b) and the second direct-through light (B2b) to the same direction DIRD', wherein DIR0', DIRA', and DIRD' are parallel to the propagation direction DIR0 of the input light (IN1).

2. The expander device according to claim 1, wherein the first guided light (B1) and the first retrieval light (B1a) propagate in a first direction (DIR1), and the second guided light (B2) and the second retrieval light (B2a) propagate in the second direction (DIR2); the angle between the first direction (DIR1) and the second direction (DIR2) is γ12, where 60≤γ12≤120°;

the fourth optical diffractive out-coupling element (4) comprises one or more regions (REG0, REG4a, REG4b, REG4c); wherein the first region (REG0) in the fourth optical diffractive out-coupling element (4) receives the third guided light (B3) and the third retrieval light (B3a) from the second optical diffractive expander element (2), and receives the fourth guided light (B4) and the fourth retrieval light (B4a) from the third optical diffractive expander element (3), and finally diffracts to form the first part of the first output light (OB4) with direction DIR0';

the overlapping region of the fourth optical diffractive out-coupling element (4) and the second optical diffractive expander element (2) is the second region (REG4a), and an overlapping region of the third optical diffractive expander element (3) and the fourth optical diffractive out-coupling element (4) is the fourth region (REG4c);

most of the third retrieval light B3a is distributed in the third region (REG4b) and the first region (REG4a) of the fourth optical diffraction out-coupling element (4); most of the fourth retrieval light B4a are distributed in the fourth region (REG4b) and the third region (REG4c); the third guided light (B3) and the third retrieval light (B3a) propagate in the third direction (DIR3), the fourth guided light (B4) and the fourth retrieval light (B4a) propagate in the fourth direction (DIR4), and the angle between the third direction (DIR3) and the fourth direction (DIR4) is 60°~120°; the third direction (DIR3) is parallel to the second direction (DIR2), and the fourth direction (DIR4) is parallel to the first direction (DIR1);

the portions of the first output light (OB4) come from different paths, and the parts are superimposed.

3. The expander device according to the claim 2, wherein the light beam propagation path thereof comprises the first primary path, the second primary path, the first retrieval path, the second retrieval path, the first short path and the second short path, wherein, the first primary path is a propagation path from the first optical diffractive in-coupling element (1) to the second optical diffractive expander element (2) and then to the fourth optical diffractive out-coupling element (4); The second primary path is the propagation path from the first optical diffractive in-coupling element (1) to the third optical diffractive expander element (3) and then to the fourth optical diffractive out-coupling element (4), the third guided light (B3) and the fourth guided light (B4) respectively pass through the first primary path and the second primary path to form a part of the output light OUT1;

the first retrieval path is from the first optical diffractive in-coupling element (1) to the first retrieval unit 2a, to the second optical diffractive expander element (2), and then to the fourth optical diffractive out-coupling element (4), the second retrieval path is from the first optical diffractive in-coupling element (1) to the second retrieval unit 3a, to the third optical diffractive expander element (3), and then to the fourth optical diffractive out-coupling element (4); the third retrieval light (B3a) and the fourth retrieval light (B4a) respectively pass through the beams of the first retrieval path and the second retrieval path to form part of the first output light (OB4);

the first short path is a propagation path from the first optical diffractive in-coupling element (1) to the region REG4a; the second short path is a propagation path from the first optical diffractive in-coupling element (1) to the fourth region (REG4c); the first direct-through light (B1b) and the second direct-through light (B2b) respectively pass through the first short path and the second short path to form part of the output light (OUT1).

4. A display apparatus (400), comprising an optical engine (10) to form a primary image and convert the primary image into a plurality of input light beams (IN1), wherein the display apparatus (400) comprising the expander device (100) according to claim 2, wherein the expander device diffracts and expands the plurality of input light beam (IN1) to form an output light beam (OUT1).

5. The expander device according to claim 3, wherein the fourth optical diffractive out-coupling element (4) diffracts the third retrieval light (B3a) and the fourth retrieval light (B4a) to form auxiliary output light (AUX4a, AUX4b, AUX4c), at the same time, diffracts the first direct-through light (B1b) and the second direct-through light (B2b) to form direct-through output light (DRE4a, DRE4c); the first part of the first output light (OB4), auxiliary output light (AUX4a, AUX4b, AUX4c) and the direct-through output light (DRE4a, DRE4c) together form the output beam (OUT1).

6. A display apparatus (400), comprising an optical engine (10) to form a primary image and convert the primary image into a plurality of input light beams (IN1), wherein the display apparatus (400) comprising the expander device (100) according to claim 3. wherein the expander device diffracts and expands the plurality of input light beam (IN1) to form an output light beam (OUT1).

7. The expander device according to claim 5, wherein the missing corners of the image information carried by and the uniformity of color for the first output light OB4, auxiliary output light (AUX4a, AUX4b, AUX4c) and direct-through output light (DRE4a, DRE4c) are different or complementary.

8. A display apparatus (400), comprising an optical engine (10) to form a primary image and convert the primary image into a plurality of input light beams (IN1), wherein the display apparatus (400) comprising the expander device (100) according to claim 5, wherein the expander device diffracts and expands the plurality of input light beam (IN1) to form an output light beam (OUT1).

9. The expander device according to claim 1, wherein the width (w2) of the second optical diffractive expander element (2) is greater than that (w1) of the first optical diffractive in-coupling element (1); The width of the expanded third guided light B3 is greater than that of the input beam IN1; the height (h3) of the third optical diffractive expander element (3) is greater than that (h1) of the first optical diffractive in-coupling element (1), and the width of the expanded fourth guided light (B4) is larger than the height of the input light (IN1);
the fourth optical diffractive out-coupling element (4) has a center position (POS40); the second region (REG4a) has a first position (POS4a); the third region (REG4b) has a second position (POS4b); the fourth region (REG4c) has a third position (POS4c); the horizontal distance between the center position (POS40) and the first position (POS4a) is 40% of the width of the fourth optical diffractive out-coupling element (4);
the first guided light (B1) does not interact with the third optical diffractive expander element (3) and the fourth optical diffractive out-coupling element (4), and the second guided light (B2) does not interact with the second optical diffractive expander element (2).

10. A display apparatus (400), comprising an optical engine (10) to form a primary image and convert the primary image into a plurality of input light beams (IN1), wherein the display apparatus (400) comprising the expander device (100) according to claim 1, wherein the expander device diffracts and expands the plurality of input light beam (IN1) to form an output light beam (OUT1).

11. A display apparatus (400), comprising an optical engine (10) to form a primary image and convert the primary image into a plurality of input light beams (IN1), wherein the display apparatus (400) comprising the expander device (100) according to claim 7, wherein the expander device diffracts and expands the plurality of input light beam (IN1) to form an output light beam (OUT1).

12. A display apparatus (400), comprising an optical engine (10) to form a primary image and convert the primary image into a plurality of input light beams (IN1), wherein the display apparatus (400) comprising the expander device (100) according to claim 9, wherein the expander device diffracts and expands the plurality of input light beam (IN1) to form an output light beam (OUT1).

13. A method of providing the output light (OUT1) by using the expander device (100) according to claim 1.

14. A method of displaying images by using the expander device (100) according to claim 1.

* * * * *